United States Patent

[11] 3,529,539

[72] Inventor Willard F. Schultz
 Bethlehem, Pennsylvania
[21] Appl. No. 802,120
[22] Filed Feb. 25, 1969
[45] Patented Sept. 22, 1970
[73] Assignee General Electric Company
 a corporation of New York

[54] ELECTRIC TOASTER WITH CRUMB TRAY
 2 Claims, 4 Drawing Figs.
[52] U.S. Cl. ..................................................... 99/400,
 292/70
[51] Int. Cl. ......................................................... A47j 37/08
[50] Field of Search ............................................ 99/400;
 292/258, 288, 70

[56] References Cited
UNITED STATES PATENTS
| | | | |
|---|---|---|---|
| 2,229,945 | 1/1941 | Uhlrig ........................... | 99/400 |
| 2,596,243 | 5/1952 | Ireland .......................... | 99/400X |
| 2,655,095 | 10/1953 | McCullough ................. | 99/400 |

Primary Examiner—Billy J. Wilhite
Attorneys—Lawrence R. Kempton, Leonard J. Platt, John F. Cullen, Frank L. Neuhauser, Oscar B. Waddell and Melvin M. Goldenberg ABSTRACT: An electric toaster construction wherein a unique spring clip is provided for connecting a crumb tray hinge to a base plate.

Patented Sept. 22, 1970

Inventor:
Willard F. Schultz
by [signature]
Attorney

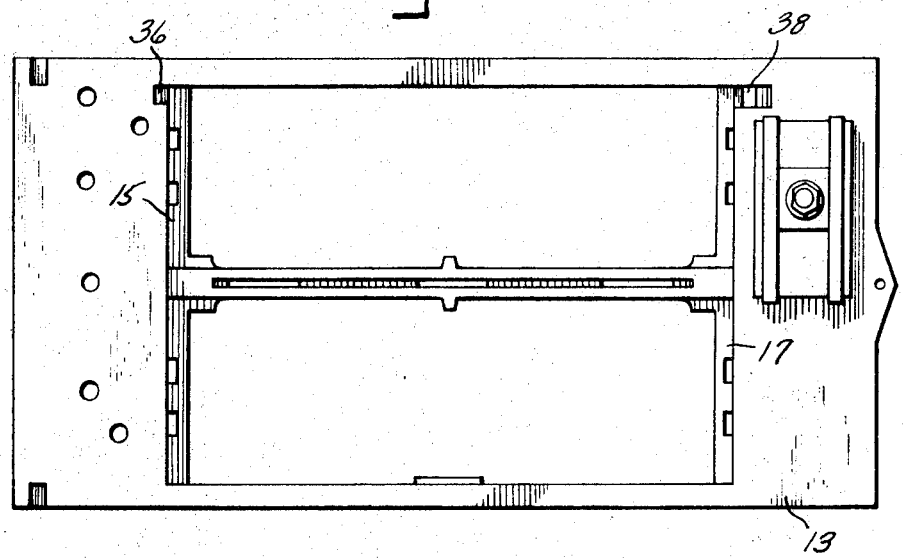
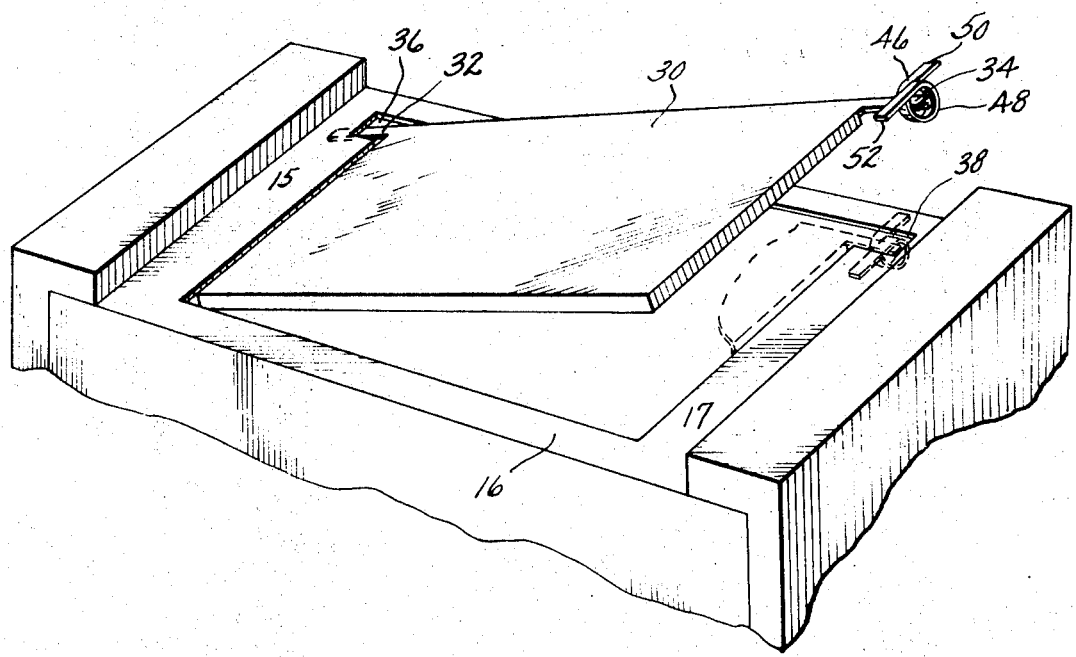
Inventor:
Willard F. Schultz 3,529,539

ELECTRIC TOASTER WITH CRUMB TRAY

BACKGROUND OF THE INVENTION

This invention relates to an electric toaster and, more particularly, to an improved arrangement for connecting a crumb tray to an electric toaster.

Electric pop-up style toasters conventionally include a crumb tray at the bottom of the toaster for catching crumbs which fall below the toasting chambers. While crumb trays have been connected to toasters in a number of different ways, it is especially desirable that they be sturdily constructed and securely assembled on the toaster. It is also desirable to provide an electric toaster which may be manufactured at relatively low cost. It is most important therefore to reduce to a minimum the number of parts required and the number of operations required to assemble a crumb tray on an electric toaster.

Accordingly, it is a primary object of this invention to provide an improved, low cost crumb tray construction for an electric toaster having a minimum number of parts which may be readily manufactured and assembled to each other.

SUMMARY OF THE INVENTION

In accordance with one of the aspects of this invention, a rigid base plate includes a slot for receiving a hinge pin of a crumb tray and a unique spring clip conveniently holds the hinge pin and the crumb tray on the toaster base plate. The clip is formed to include a 360° loop at its central portion, and two tangentially extending end portions. The tangentially extending end portions are arranged to be substantially in the same plane as each other and the diameter of the central loop portion is arranged to be greater than the width of the slot in the base plate. With this construction, the hinge pin and the crumb tray may be quickly assembled to the base plate by simply inserting the hinge pin within the center of the loop and pressing the loop and the hinge pin downwardly into the slot. During assembly, the loop of the clip is temporarily compressed as it passes into the slot and then it firmly snaps back when it is fully located within the slot. By this arrangement, a very simple yet effective means for connecting and holding a crumb tray on an electric toaster is achieved.

BRIEF DESCRIPTION OF THE DRAWING

Other objects and attendant advantages of the invention will be apparent from the following description taken in connection with the accompanying drawing in which:

FIG. 3 is a bottom plan view of the base plate of the electric toaster illustrated in FIG. 1 with the crumb tray removed; and FIG. 4 is a bottom perspective view of the electric toaster shown in FIG. 1 illustrating the crumb tray being attached to the base plate of the toaster.

DESCRIPTION OF THE PREFERRED EMBODIMENT

Figure 1:
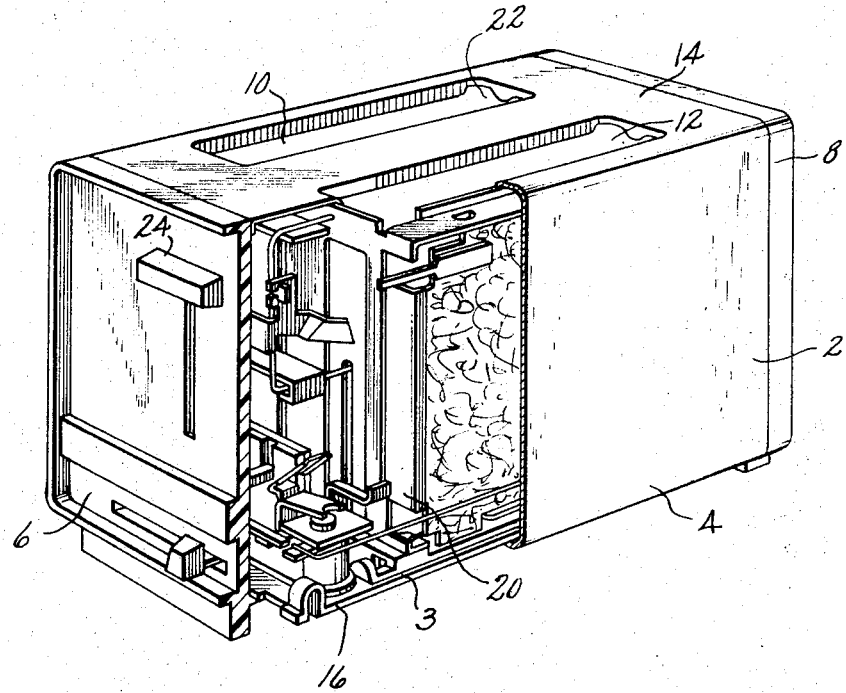
FIG. 1 is a perspective view of an electric toaster construction embodying the invention partially broken away to show details of construction.

Referring now to the drawing and first particularly to FIG. 1, there is shown an electric toaster 2 which includes an inner supporting structure 3, an outer cover 4 and spaced vertical end walls 6 and 8. Bread receiving slots 10 and 12 are formed in a top wall 14 of the outer casing. A relatively rigid base plate 16, preferably formed as a casting of aluminum or other suitable metal, is provided for supporting heater frame modules and other components of the toaster.

Figure 2:
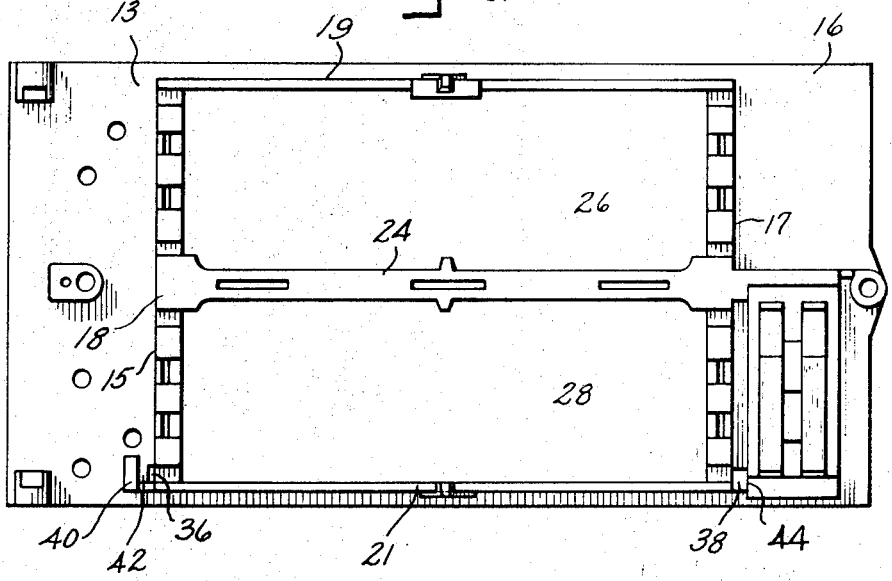
FIG. 2 is a top plan view of the base plate of the electric toaster illustrated in FIG. 1.

Referring now to FIG. 2, there is shown a top plan view of the base plate casting 16. As illustrated, the base plate 16 includes a bottom wall 13 and raised central portion 18 for supporting heater frame modules 20 and 22, as shown in FIG. 1. The raised central portion includes two side walls 15 and 17 having upper surfaces upon which the heater frame modules 20 and 22 may be positioned, and the base plate 16 also includes integrally formed front and rear walls 19 and 21 which also support portions of the heater frame modules. A centrally positioned wall 24 divides the central portion into two enlarged openings 26 and 28. Conventionally, the enlarged openings 26 and 28 permit bread crumbs and other material to drop below the toasting chambers, and a crumb tray 30, as illustrated in FIG. 4 is provided below the toasting chambers for catching the crumbs which fall below the toasting chambers.

In accordance with my invention, the crumb tray 30 is formed from a flat piece of sheet metal of a sufficient size for closing the enlarged openings 26 and 28, and includes two outwardly extending hinge tabs 32 and 34. The tabs 32 and 34 are preferably integrally formed with the sheet metal crumb tray during the same stamping operation which is required for forming the body portion of the crumb tray.

In accordance with my invention, the base plate 16 is uniquely formed while it is being cast to provide portions for receiving and supporting the crumb tray 30. As shown more particularly in FIG. 3, slots 36 and 38 are formed in side walls 15 and 17 for receiving hinge tabs 32 and 34, respectively.

Referring now to FIG. 2, a lug 40 extends upwardly from the base plate adjacent to slot 36. With this construction, hinge tab 32 of the crumb tray may be inserted within slot 36 and axial movement of the hinge tab 32 will be limited by the upwardly extending lug 40. In a similar manner, a portion 42 of the bottom wall of the base plate suitably limits movement of the hinge pin tab 32 in a downward direction.

It can be appreciated that the axial extent of slot 38 is formed to be somewhat larger than that of slot 36 for permitting the hinge pin tab 34 to be readily received by the slot after pin 32 has been positioned in slot 36. Although a lug similar to lug 40 could be provided for limiting axial movement of hinge pin 34, in the embodiment illustrated in FIGS. 3 and 4 axial inward movement of the hinge pin 38 is limited by a wall 44 of the toaster switch casing.

In accordance with my invention, a uniquely shaped and positioned spring clip 46 is provided for limiting upward movement of hinge pin tab 34. As illustrated more particularly in FIG. 4, the spring clip 46 comprises a flat strip of spring steel which is wound to form a central loop portion 48 and two tangentially extending end portions 50 and 52. As illustrated, the loop portion 48 is a full loop and encompasses 360°, and the end portions 50 and 52 are arranged to be substantially in the same plane as each other. The loop portion 48 and the slot 38 are dimensioned so that the diameter of the loop is greater than the width of the slot. Accordingly, when the loop portion of the spring clip is inserted within the slot 38, the loop is temporarily compressed to a smaller diameter and then, as illustrated by the dotted lines in FIG. 4, when the loop has passed the throat of the slot, it firmly snaps back to grip the inside walls of the slot.

With this arrangement, the spring clip 46 is utilized for readily and easily assembling the crumb tray to the base plate of the toaster. The unique clip is first slipped over the hinge pin tab 34, the other hinge pin tab 32 is positioned within the slot 36, and then the hinge pin tab 34 and the spring clip 40 are readily pushed into slot 38.

With this construction, it can be readily appreciated that the spring clip may be easily inserted within slot 38; however, it cannot be removed by exerting forces on the exposed part of the clip or the crumb tray. For example, any downward motion of the crumb tray hinge 38 on the inside surface of the loop 48 of the clip will tend to enlarge the loop, and naturally, with an increased diameter the loop cannot pass through the throat of the slot 38. In like manner, any attempt to remove the spring clip by pulling upwardly on the ends 50 and 52 of the loop will also tend to make the loop portion of the clip larger thereby increasing the diameter of the loop and preventing the loop from being removed from the slot 38. Should it be necessary or desirable to remove the crumb tray from the base plate of the toaster, the spring clip 48 may be readily removed by simply inserting a screw driver or other tool against the top portion of the loop. As illustrated more particularly in FIG. 2, when pressure is exerted on the top portion of the loop 48, that is, the portion opposite from the point where the tangential end portions intersect each other, the side surfaces of the loop will be pressed against the sides of the slot thereby reducing the diameter of the central loop portion 48 of the clip to thereby allow the clip to be removed from the slot 38.

Accordingly, it can be seen that the crumb tray 18 may be quickly and securely connected to the toaster with the use of a single piece of fastening hardware. Moreover, the assembly does not require any twisting or forming of tabs with tools. It is merely necessary to press the spring clip 46 into slot 38.

From the foregoing description, it will be appreciated that my improved crumb tray arrangement includes a minimum number of relatively easily manufactured parts. All of the slots and lugs which are provided on the base plate may be integrally formed with the base plate at the same time that other projections, tabs and slots are being formed in the cast base plate. The crumb tray itself may be formed in a simple stamping operation, and the spring clip may be readily stamped and formed. Thus, an exceedingly simple, yet sturdily constructed arrangement has been provided for attaching a crumb tray to an electric toaster.

I claim:
1. An electric toaster construction comprising:
   a. a base plate having a slot formed therein for receiving a hinge pin; and
   b. a spring clip for holding said hinge pin within said slot, said clip including a generally flat piece of spring material which is formed to include a 360° loop at its central portion and two tangentially extending end portions, said tangentially extending end portions being arranged to be substantially in the same plane as each other, the diameter of said central loop portion being greater than the width of said slot so that the hinge pin may be positioned within the center of the loop and the hinge pin may be attached to the base plate by pressing the loop and the hinge pin downwardly into the slot whereby the loop of the clip is temporarily compressed as the pin passes into the slot and then firmly snaps back when the loop and pin are fully positioned within the slot.
2. An electric toaster construction comprising:
   a. a rigid base plate having a bottom wall;
   b. side walls extending upwardly from said bottom wall forming an enlarged opening for receiving crumbs and other waste material from toasting chambers positioned thereabove;
   c. a sheet metal crumb tray, said crumb tray being positioned to selectively close and open said enlarged opening;
   d. walls forming a pair of slots extending upwardly from the bottom surface of said bottom wall, said slots extending outwardly from said enlarged opening;
   e. said crumb tray including a pair of tabs extending outwardly therefrom, each of said tabs being received in a respective one of said slots; and
   f. a spring clip for holding one of said tabs within one of said slots, said clip including a generally flat piece of spring material which is formed to include a 360° loop at its central portion and two tangentially extending end portions.